(12) United States Patent
Mahoney et al.

(10) Patent No.: US 11,576,462 B2
(45) Date of Patent: Feb. 14, 2023

(54) FOOTWEAR WITH MESH SOLE CONSTRUCTION

(71) Applicant: Saucony, Inc., Waltham, MA (US)

(72) Inventors: Christopher J. Mahoney, Concord, MA (US); Luca B. Ciccone, Leominster, MA (US); Andrea A. Paulson, Arlington, MA (US)

(73) Assignee: Saucony, Inc., Waltham, MA (US)

(*) Notice: Subject to any disclaimer, the term of this patent is extended or adjusted under 35 U.S.C. 154(b) by 183 days.

(21) Appl. No.: 16/915,616

(22) Filed: Jun. 29, 2020

(65) Prior Publication Data

US 2021/0401114 A1    Dec. 30, 2021

(51) Int. Cl.
*A43B 13/12*    (2006.01)
*A43B 13/14*    (2006.01)
*A43B 13/28*    (2006.01)
*B29D 35/08*    (2010.01)

(52) U.S. Cl.
CPC .......... *A43B 13/125* (2013.01); *A43B 13/141* (2013.01); *A43B 13/28* (2013.01); *B29D 35/08* (2013.01)

(58) Field of Classification Search
CPC ............................ A43B 13/141; A43B 13/125
See application file for complete search history.

(56) References Cited

U.S. PATENT DOCUMENTS

| | | | | | |
|---|---|---|---|---|---|
| 4,151,662 | A | * | 5/1979 | Vistins | A43B 3/02 36/98 |
| 4,172,293 | A | * | 10/1979 | Vistins | A41D 13/04 2/48 |
| 6,655,048 | B2 | * | 12/2003 | Moretti | A43B 7/08 36/3 R |
| 6,860,036 | B2 | * | 3/2005 | Zhu | A43B 23/07 36/98 |
| 6,986,183 | B2 | * | 1/2006 | Delgorgue | A43B 23/0215 36/98 |
| 9,060,562 | B2 | * | 6/2015 | Meir | D04B 1/123 |
| 9,687,040 | B2 | * | 6/2017 | Peikert | A43B 7/08 |
| 9,756,898 | B2 | * | 9/2017 | Peikert | A43B 1/04 |
| 9,924,761 | B2 | * | 3/2018 | Huffa | A43B 3/0078 |
| 10,299,531 | B2 | * | 5/2019 | Zavala | A43B 23/025 |
| 2004/0139629 | A1 | * | 7/2004 | Wiener | A43B 9/02 36/12 |
| 2008/0016717 | A1 | * | 1/2008 | Ruban | A43B 23/0295 36/50.1 |
| 2016/0295971 | A1 | | 10/2016 | Arnese et al. | |
| 2016/0302517 | A1 | * | 10/2016 | Jessiman | A43B 13/187 |
| 2020/0390188 | A1 | * | 12/2020 | Cass | A43B 13/184 |

* cited by examiner

*Primary Examiner* — Jila M Mohandesi
(74) *Attorney, Agent, or Firm* — Warner Norcross + Judd LLP (57) ABSTRACT

A footwear construction includes a midsole including a lateral sidewall and a medial sidewall, and a mesh substrate layer covering the lateral sidewall and medial sidewall to protect the surfaces of those sidewalls from abrasion, wear and damage, and in some cases to provide tuned stiffness to the sidewalls and thus the midsole. The mesh substrate layer can wrap partially above and below the midsole so that edges of the layer can be conceals between the midsole and an upper, or between the midsole and an outsole layer. The mesh substrate can include a mesh material and a film sheet bonded to one another, with the film sheet facing the midsole and the mesh textile facing outward in the finished footwear. A related method of manufacture also is provided.

16 Claims, 10 Drawing Sheets

FOOTWEAR WITH MESH SOLE CONSTRUCTION

BACKGROUND OF THE INVENTION

The present invention relates to footwear, and more particularly to footwear including a sole assembly having a mesh substrate layer disposed adjacent an outer surface of a sole component to provide protection and/or predetermined cushioning and stiffness characteristics to the sole component.

A variety of different types of sole assemblies are used in footwear. Many sole assemblies include a midsole constructed from foam, and an underlying outsole, usually constructed from rubber for durability. The foam provides underfoot cushion, and the outsole can include lugs for traction and wear resistance. Some sole assemblies also can include a footbed above the midsole to enhance comfort while the footwear is worn by a wearer.

Many manufacturers, particularly of running and performance footwear, construct the midsole or the footbed from a soft, lower density material so that the midsole can provide enhanced cushioning and energy return. A variety of materials are available to construct such a midsole, including ethyl vinyl acetate (EVA), expanded thermoplastic polyurethane (eTPU), and more recently, polyether block amides (PEBA). While all these midsole materials function to provide cushion and some energy return, the latter are lighter and many times more spongy to provide enhanced functionality. Some types of eTPU and PEBA, however, can be relatively soft, compliant and easily damaged, degraded and/or abraded.

One issue is that many manufacturers want to show the consumer that these materials are present in the midsole as a marketing tool. As a result, the exterior surface of midsoles from such materials is usually bare and exposed to the environment. Accordingly, when shoes including such materials are worn in more hostile environments, objects, dirt, debris, sticks and rocks can degrade, abrade, puncture and deform the exterior surface, which can impair and/or change the functionality and cushioning or energy return characteristics of these materials. In some cases, such midsoles abrade away quickly. This also can lead to an unsightly, ragged or beat up appearance to the midsole, which is unacceptable to many, and can necessitate replacement of the footwear after minimal use.

Another issue with some midsoles constructed from eTPU and PEBA is that they do not have much shear strength, which can make the midsoles roll side to side underfoot, potentially causing ankle or knee injuries. Some manufacturers therefore include large plastic support plates at the heel of the footwear to reduce this rolling and instability. While this helps, it can add to the weight of the shoe, and can produce an interrupting extra structural component on an otherwise clean exterior of the midsole. These pieces of plastic also do not protect other parts of the soft material midsole from abrasion and puncture.

Accordingly, there remains room for improvement in the construction of sole assemblies made from softer, abrasion and wear prone materials to improve their durability, wear resistance and stiffness or support.

SUMMARY OF THE INVENTION

A footwear construction includes a midsole including a lateral sidewall, a medial sidewall and a mesh substrate layer covering the lateral sidewall and/or medial sidewall to protect the surfaces of those sidewalls from abrasion, wear and damage, and in some cases to provide tuned stiffness to the sidewalls and thus the midsole.

In one embodiment, the mesh substrate layer can wrap partially above and below the midsole so that edges of the layer can be concealed between the midsole and an upper, or between the midsole and an outsole layer.

In another embodiment, the mesh substrate can include a mesh material and a film sheet bonded to one another, with the film sheet facing the midsole and the mesh material facing outward in the finished footwear. The film sheet and mesh material can be coextensive, with the film sheet adding rigidity to the mesh material.

In still another embodiment, the mesh material can be a textile mesh material constructed from multiple strands. The strands can be arranged to form multiple openings through the mesh material. The openings can be large enough so that the film sheet and/or the midsole is visible through the openings in the mesh material.

In yet another embodiment, the film sheet can face toward and join with the midsole sidewall, while the mesh material can face outward, forming an aesthetic design on the exterior of the mesh substrate layer to improve the appearance of the midsole while providing protection thereto.

In even another embodiment, the mesh substrate layer can extend inward from the midsole sidewall toward a longitudinal axis of the midsole. The mesh substrate layer can terminate at an edge. The edge can be disposed between the midsole sidewall and the longitudinal axis such that the mesh substrate layer does not extend across a width of the midsole that is perpendicular to the longitudinal axis.

In a further embodiment, the mesh substrate layer can include upper and lower portions that are trimmed and folded over upper and lower edges of the midsole. The upper and lower portions can extend over respective upper and lower surfaces of the midsole. The upper and lower portions can be sandwiched between an upper and the upper midsole surface, and the outsole layer and lower midsole surface, respectively.

In another, further embodiment, the mesh substrate layer can vary in thickness around certain parts of the midsole sidewalls to provide customized compression and cushion in the midsole. For example, the mesh substrate layer can be thicker on a medial sidewall than on a lateral sidewall to counter over pronation of a wearer's foot. As another example, the mesh substrate layer can be thicker on a lateral sidewall than on a medial sidewall to counter supination of a wearer's foot. As yet another example, the mesh substrate layer can become thicker from heel to toe, so that the heel provides ample cushion, while the midsole in the forefoot is more rigid and less prone to compress or role in an unstable manner. As still another example, the thickness of the mesh substrate layer can vary in thickness from the upper portion to the lower portion thereof, becoming thicker or thinner from the upper portion to the lower portion.

In still a further embodiment, a method is provided including: providing a midsole mold cavity in the shape of a foot, the mold cavity including a mold sidewall; securing a strip of a mesh substrate layer around a portion of the mold cavity so that the mesh substrate layer is adjacent the mold sidewall; closing at least a portion of the mold cavity; introducing a material into the mold cavity so that the material bonds to the mesh substrate layer; allowing the material to cure in the mold cavity to form a midsole; and removing the midsole from the mold cavity with the mesh substrate layer bonded to and covering a midsole sidewall.

In yet a further embodiment, the method can include securing an upper portion of the mesh substrate layer above the mold sidewall away from the mold cavity; and securing a lower portion of the mesh substrate layer below the mold sidewall away from the mold cavity. The upper portion and lower portion do not contact the material as the material is introduced so that the upper portion and lower portion are free extending from the midsole.

In even a further embodiment, the method can include penetrating the upper portion and the lower portion with upper pins and/or lower pins respectively during the respective securing steps. The pins can hold the mesh substrate layer in a fixed position relative to the mold cavity to precisely join the midsole and the mesh substrate layer.

The present footwear construction provides benefits in midsole material protection and durability, compression and stability control, and energy return that previously have not been achievable. The current sole assembly, with its mesh substrate layer on one or more walls of a midsole, protect those sidewalls from objects in the environment in which the footwear is worn. In some cases, the midsole material can be varied to include much softer, less durable material with a protective mesh substrate covering it to improve durability and provide abrasion resistance. The construction also can be fine-tuned by varying the thickness of the mesh substrate layer to counter supination and over pronation. The rebound and dampening characteristics from heel to toe and/or ground to foot also can be varied by varying the thickness of the mesh substrate layer in different regions or at different levels of the midsole.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
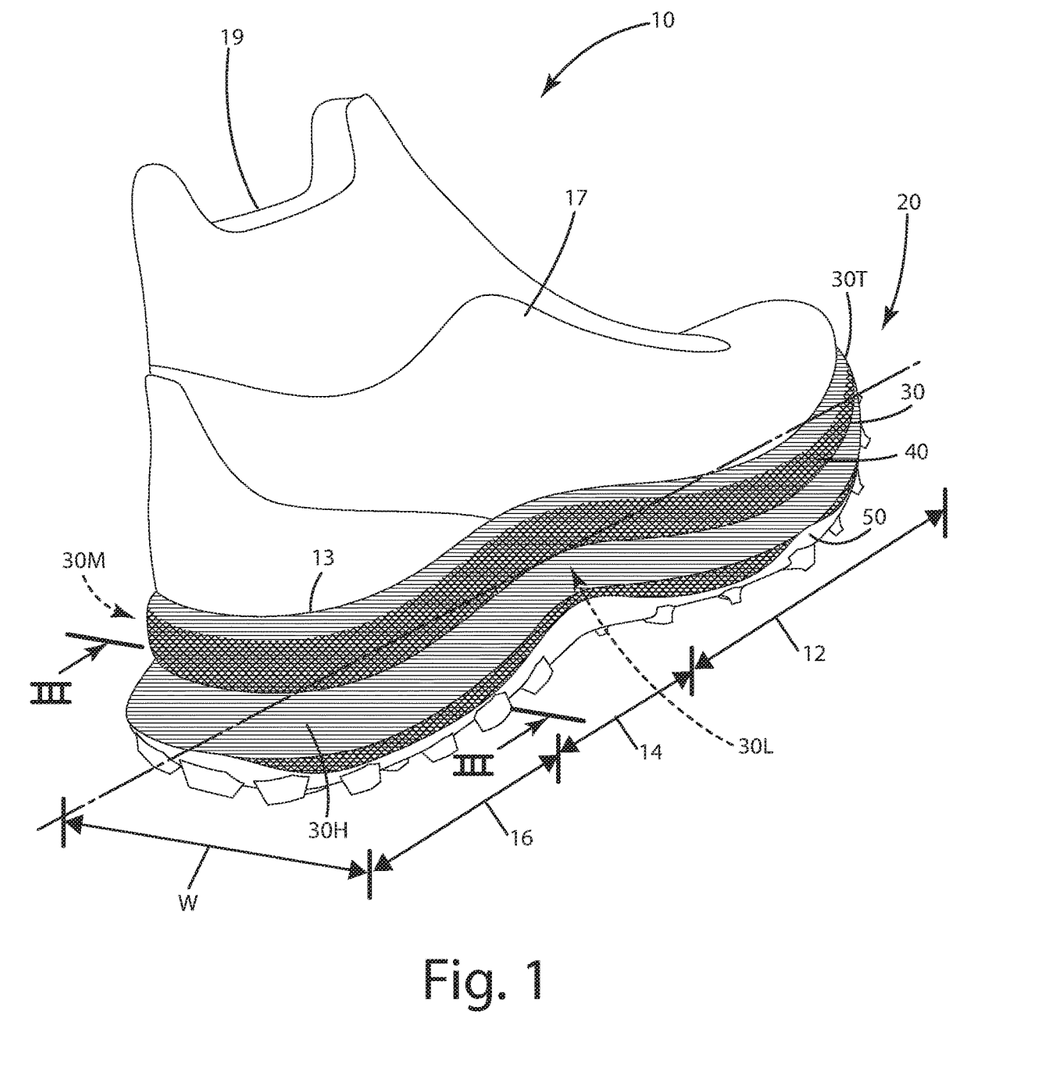
FIG. 1 is a rear perspective view of footwear of a current embodiment illustrating the sole assembly with a mesh substrate layer.
Figure 2:
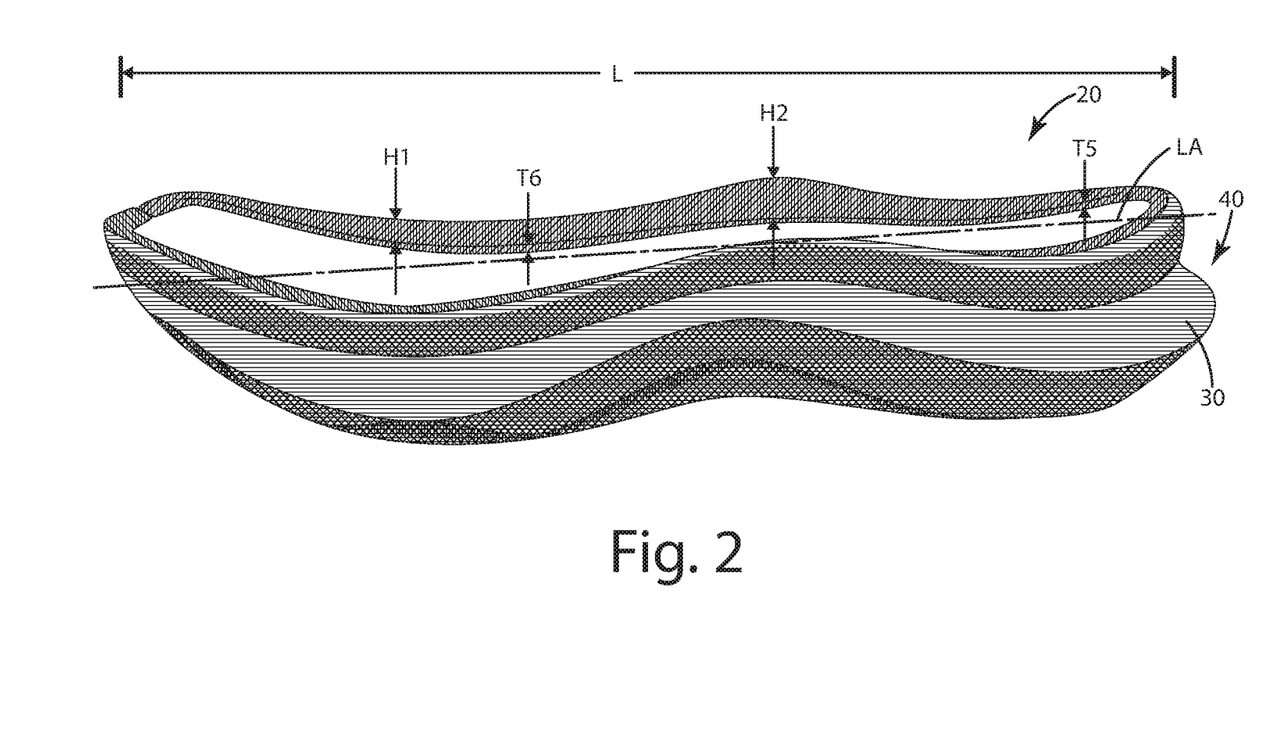
FIG. 2 is a side perspective view of the midsole wrapped with the mesh substrate layer.
Figure 3:
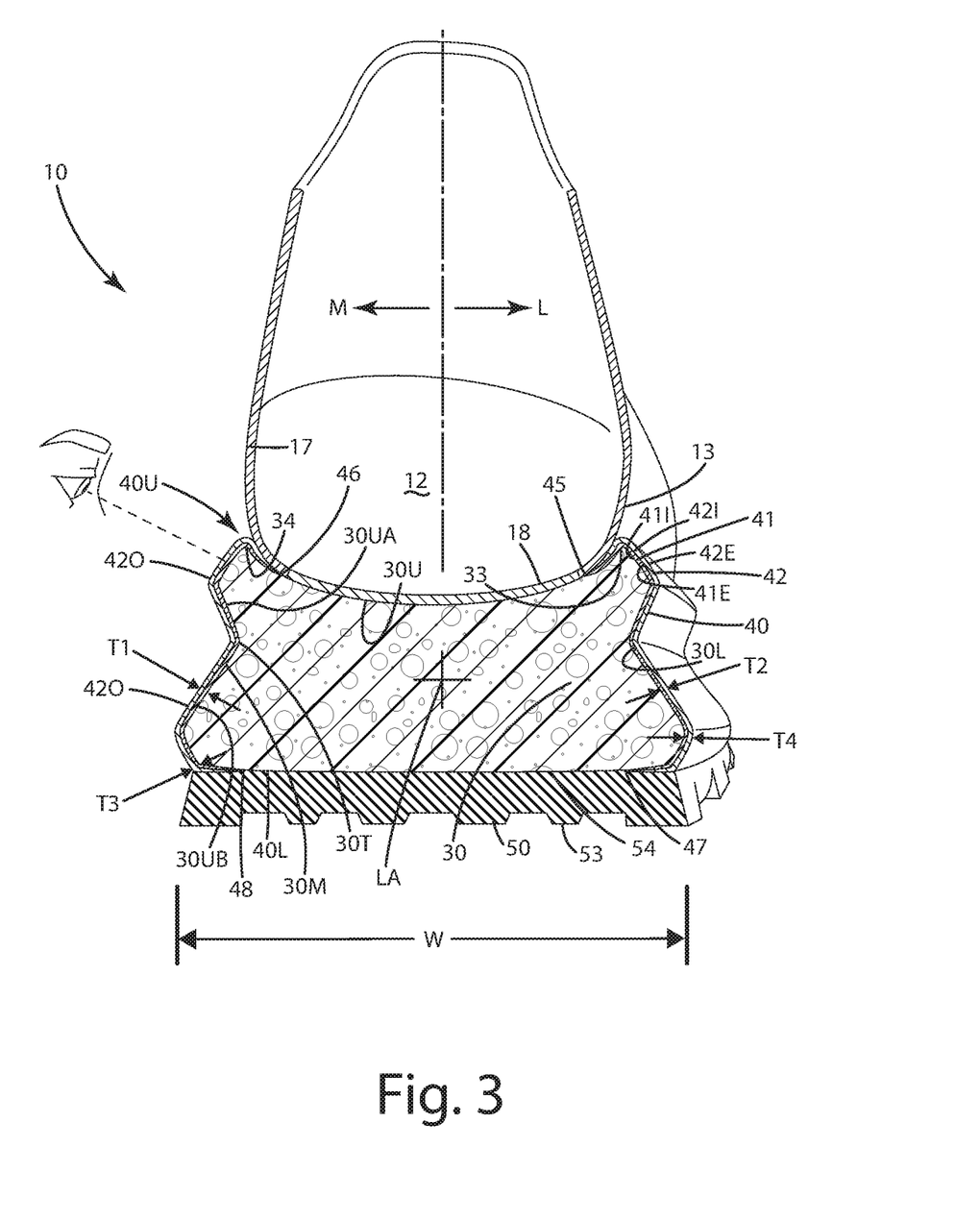
FIG. 3 is a section view of the footwear with the midsole and mesh layer substrate taken along line 3-3 of FIG. 1.

A current embodiment of the footwear is illustrated in FIGS. 1-3 and generally designated 10. In this embodiment, the footwear includes a sole assembly 20 including a midsole 30, a mesh substrate layer 40 overlaying the midsole sidewalls, and an outsole layer 50 having multiple treads. Although the current embodiment is illustrated in the context of a running shoe, the sole assembly thereof can be incorporated into any type or style of footwear, including performance shoes, trail shoes and boots, work boots, all-terrain shoes, hiking shoes, athletic shoes, running shoes, sneakers, conventional tennis shoes, walking shoes, multi-sport footwear, casual shoes, dress shoes or any other type of footwear or footwear components. It also should be noted that directional terms, such as "vertical," "horizontal," "top," "bottom," "upper," "lower," "inner," "inwardly," "outer" and "outwardly," are used to assist in describing the invention based on the orientation of the embodiments shown in the illustrations. Further, the terms "medial," "lateral" and "longitudinal" are used in the manner commonly used in connection with footwear. For example, when used in referring to a side of the shoe, the term "medial" refers to the inward side (that is, the side facing the other shoe) and "lateral" refers to the outward side. When used in referring to a direction, the term "longitudinal direction" refers to a direction generally extending along the length of the shoe between toe and heel, and the term "lateral direction" refers to a direction generally extending across the width of the shoe between the medial and lateral sides of the shoe.

The use of directional terms should not be interpreted to limit the invention to any specific orientation. Further, as used herein, the term "arch region" (or arch or midfoot) refers generally to the portion of the footwear or sole assembly corresponding to the arch or midfoot of the wearer's foot; the term "forefoot region" (or forefoot) refers generally to the portion of the footwear forward of the arch region corresponding to the forefoot (for example, including the ball and the toes) of a wearer's foot; and the term "heel region" (or heel) refers generally to that portion of the footwear rearward of the arch region corresponding to the heel of the wearer's foot. The forefoot region 12, arch region or mid-foot region 14, and heel region 16 generally are identified in FIG. 1; however, delineation of these regions may vary depending upon the configuration of the sole assembly and/or footwear.

With reference to FIGS. 1-3, the footwear 10 can include a sole assembly 20. The sole assembly 20 can include a midsole 30, a mesh substrate layer 40 and an outsole layer 50. More or fewer elements of the sole assembly 20 can be included in some embodiments. The components of the sole assembly can individually and/or collectively provide the article of footwear 10 with a number of attributes, such as energy return, pronation correction, supination correction, support, rigidity, flexibility, stability, cushioning, comfort, reduced weight, and/or other attributes. Generally, regardless of which components are present, the sole assembly 20 can form the bottommost portion of the footwear 10. The sole assembly 20 can include a side-to-side width W, a heel-to-toe longitudinal length L and a longitudinal axis LA, which can be shared with the sole assembly, midsole and outsole layer.

The footwear 10 can include a textile upper 17 joined with the sole assembly 20. The upper 17 can be formed from a variety of material elements joined together to cover at least a portion of the wearer's foot. The material elements can be selected based on the intended uses of the article of footwear 10, and can include synthetic textiles, mesh textiles, polymers or leather, for example. The upper 17 can be constructed to improve the rigidity of the sole assembly 20. For example, the upper can be constructed from leather, plastic, canvas or other materials. The upper 17 can include one or more closure elements, including for example shoelaces (not shown). The upper 17 additionally includes an upper opening 19 for receiving the wearer's foot and a lower periphery 13 for attachment to the sole assembly 20.

A footbed (not shown) can be positioned within the void defined by the upper and can be non-stretchable and lightweight and joined to the upper to provide a void for receipt of the wearer's foot. The footbed can be constructed from a sheet of material, such as foam, EVA, polyurethane (PU), latex, gel or other materials, and by virtue of its compressibility, provide cushioning, and may also conform to the foot in order to provide comfort, support and stability. The lower peripheral allowance or edge of the upper can be stitched, cemented or otherwise fastened to the footbed around the perimeter of the footbed. The sole assembly 20 can be combined with any other type or style of upper construction capable of being suitably joined with it, for example, a Strobel construction. With a Strobel construction, a Strobel board or insole board or insole 18 can be joined with the lower peripheral allowance 13 of the upper to close the void 12 of the upper. The joining of the sole assembly/outsole and the upper can be accomplished using adhesives, cement, injection molding, pour molding or any other technique used to join an upper and sole assembly.

With reference to FIGS. 1-3, the sole assembly can include a midsole 30, mesh substrate layer 40 and outsole layer 50. The midsole 30 can include midsole upper surface 30U, a ground facing midsole lower surface 30LS, a midsole lateral sidewall 30L and a midsole medial sidewall 30M. The midsole upper surface 30U can include a lateral transition 33 which transitions to the lateral sidewall 30L, optionally at a curved lip. Of course, in other constructions, the transition can include angled surfaces that meet at an angled corner. The midsole upper surface 30U can include a medial transition 34 which transitions to the medial sidewall 30M, optionally at a curved lip. This transition can include angled surfaces that meet at an angled corner. The lateral and medial transitions can be of a different height H1 in the forefoot versus the height H2 in the arch region. Optionally, height H2 can be greater than the height H1. As described below, the mesh substrate layer can overlap these transitions differently. Along the length L of the midsole, the transitions and the midsole upper surface can form a downward recess across the width W along different parts of the length of the midsole 30.

As shown, the midsole upper surface 30U can be joined to the Strobel board 18, and portions of the lower peripheral allowance 13 of the upper. The attachment can be via cement, adhesives, heat bonding, stitching, or other techniques and structures. The respective transitions also can be joined with these structures, optionally more with the lower peripheral allowance than the Strobel board. In some cases, the Strobel board might not overlap the transitions.

The midsole lower surface 30LS can be contoured or flat depending on the footwear application and the interaction with the outsole layer 30. As shown, the midsole lower surface 30LS can be joined with the upper surface 54 of the outsole layer 50 across the width W. The attachment can be via cement, adhesives, heat bonding, stitching or other techniques and structures.

As mentioned above, the midsole can include the midsole sidewalls 30M and 30L. These sidewalls can take on a variety of contours leading from the upper surface to the lower surface. In some cases, the sidewalls can be concave or convex. As shown, they can be generally concave, with the sidewalls including angled subpart walls 30UA and 30UB. These subpart walls can come together at an angled or curved transition region 30T.

The midsole 30 can be constructed from a variety of materials, such as ethyl vinyl acetate (EVA), polyurethane (PU), latex, a gel, expanded thermoplastic polyurethane (eTPU), and/or polyether block amides (PEBA), such as plasticizer-free poly(ether-b-amide)s offered under the tradename Pebax® from Arkema of France. Due to the mesh substrate layer covering and protecting the midsole, the materials selected can be softer, more compliant, more elastic and/or more able to be abraded when not covered. In some cases, the material can have a durometer of optionally less than 75 Shore D, less than 60 Shore D, less than 40 Shore D, less than 30 Shore D, less than 25 Shore D, between 25 Shore D and 50 Shore D, inclusive, between 25 Shore D and 40 Shore D, inclusive, or between 20 Shore D and 35 Shore D inclusive. In some cases, the material can have a tear strength of optionally less than 170 kN/m, less than 150 kN/m, less than 125 kN/m, less than 100 kN/m, less than 75 kN/m, less than 50 kN/m, between 40 and 150 kN/m, inclusive, between 50 and 125 kN/m, inclusive, or between 60 and 100 kN/m.

With reference to FIGS. 1-3, the mesh substrate layer 40 and its interface with the midsole 30 will be described in more detail. The mesh layer 40 as shown can include one or more different sublayers, and optionally can be in the form of those sub layers laminated, bonded, glued or otherwise joined with one another. As shown, the mesh layer 40 can include a first or inner sub layer 41 and a second or outer sub layer 42. The inner layer 41 can be a film sheet, strip, coating, thickness or layer (all referred to as a film sheet). This film sheet can be a polymeric material constructed from a thermoplastic, fabric or composite. The film sheet 41 can be generally flexible and pliable, and can conform to the contours of the midsole. In some cases, the film sheet can be semi-rigid and able to thermoset so that the film sheet, when engaged by a heated midsole material in a mold, will also mold to the contours of the mold, taking on and curing to a predefined contour. Optionally, the film sheet can bond to the outer surfaces of the midsole, taking on the shapes accordingly, and remaining attached to those surfaces. In some cases, the film sheet 41 can stretch shrink or deform in other ways.

The film sheet or inner sub layer 41 can include a film interior surface 41I and a film exterior surface 41E. The film interior surface 41I can engage the respective lateral and medial sidewalls 30L and 30M. The film exterior surface 41E can face outward, away from the midsole. That film exterior surface 41E can be joined with the outer sub layer 42, which can be a mesh layer. The mesh layer 42 can be a mesh material, such as an engineered mesh, a knitted mesh, a weaved mesh or other types of meshes or an open lattice material, such as polymeric or composite material. The mesh material can be constructed from a textile, and can be generally non-rigid, compliant, and in some cases stretchable. The mesh layer 42 can include multiple individual openings 42O that can be repeatedly produced in the layer. The openings can be of a diamond shape, triangle shape, polygonal shape, circular shape, elliptical shape, rounded shape or of any other aesthetic and/or ornamental configuration. The openings can extend completely through the mesh layer so that the film sheet or midsole or other layer thereunder can be visible through the openings. The openings can be optionally less than 10 $mm^2$, less than 8 $mm^2$, less than 6 $mm^2$, less than 4 $mm^2$, less than 2 $mm^2$ or less than 1 $mm^2$, and can show similarly sized parts of the film through such sized openings.

As shown in FIG. 3, the mesh layer can include a mesh interior surface 42I and a mesh exterior surface 42E. The mesh interior surface 42I can engage the film exterior surface 41E and can be bonded or joined directly thereto. The mesh exterior surface 42E can face outward, away from the midsole and the film sheet. That mesh exterior surface can include the above openings 42O, and optionally can form the outermost or exterior surface of the sole assembly between the upper 17 and the outsole layer 50.

Cooperatively, the mesh player 42 and film layer 41 can form a wear and abrasion resistant covering over the walls of the midsole. Generally, the mesh substrate layer can prevent and/or impair (collectively, prevent) abrasion and damage thereto by objects with which the footwear contacts during use by a wearer. The mesh layer also can add an aesthetic appeal to the sole assembly. The mesh substrate layer 40 can wrap around the midsole perimeter, optionally extending over, covering and/or concealing the lateral 30L and medial 30M sidewalls, the heel wall 30H and forward or toe wall 30T of the midsole. The mesh layer 42 can be visible in all of these regions, or in select ones of these regions. For example, as shown the mesh layer is showing and visible over the lateral and medial sidewalls, as well as the heel wall, but concealed by part of the outsole layer 50 in the toe. Other portions and amounts of the mesh layer and substrate can be covered by the outsole layer and other components depending on the application.

Optionally, the mesh substrate layer 40 can vary in thickness to provide different cushioning, dampening, stiffness and rebound to the midsole. For example the mesh substrate layer 40 can have thicknesses T1 and T2 on the medial 30M and lateral 30L sidewalls. These thicknesses can be equal or different. For example, T1 can be greater than T2 to enhance the rigidity of the midsole along the medial sidewall. This can reduce or counter over pronation of a wearer's foot. As another example, the T2 can be greater than T1 to reduce or counter supination of a wearer's foot. These thicknesses can be varied by varying the overall thickness of the layer 40, or of the film, or of the mesh, or both. In some cases, the thickness of the film sheet 41 is varied, while the mesh layer 42 remains the same. Optionally, the film sheet can have a thickness of optionally less than 5 mm, less than 4 mm, less than 3 mm, less than 2 mm, or less than 1 mm. Differing the thickness of the film from one portion to the next, or one region to the next, can alter the overall stiffness or support or rigidity to the respective lateral and medial sidewalls, and/or the heel wall. In some cases, the mesh can remain of a constant thickness, with only the film sheet thickness changing.

Optionally, the mesh substrate layer 40 can become thicker from heel to toe, so that the heel provides ample cushion, while the midsole in the forefoot is more rigid and less prone to compress or role in an unstable manner. In such a case, the thickness T5 in the heel can be less than the thickness T6 shown in FIG. 2. Further optionally, the thickness of the mesh substrate layer can vary in thickness from the upper portion to the lower portion thereof, becoming thicker or thinner from the upper portion to the lower portion. As shown in FIG. 3, the mesh substrate layer 40 higher thicknesses T1 and T2 on the respective medial and lateral sidewalls can be less than the lower thicknesses T3 and T4. This can in some cases add stability and rigidity while controlling the expansion of the midsole within the mesh substrate layer.

As mentioned above, the sole assembly 20 can include an outsole layer 50. This outsole layer 50 can include multiple lugs and/or treads that extend downward, or alternatively can be relatively featureless, forming a smooth surface. Where present, the lugs and treads can be arranged as desired, and alternatively in a repeating pattern. The lugs and treads can include one or more geometric shapes. The outsole tread can be constructed from one or more materials, for example, natural or synthetic rubber, thermoplastic polyurethane elastomers, nylon, polymer blends, wear resistant polymers, elastomers and/or other materials. Other materials, such as fiber-reinforced polymers can be used, which can include epoxy, polyethylene or thermosetting plastic reinforced with carbon, glass and/or aramid fibers for enhanced protection.

The outsole 50 can include an upper surface 54 and an opposing outsole lower surface 53. The lower surface 53 can include the optional treads or lugs, and otherwise can form a ground contacting surface of the outsole 50. The upper surface 54 can be joined with the lower surface 30LS of the midsole as shown in FIG. 3.

The mesh substrate layer 40 can be joined with the midsole 30, as well as interface with the outsole layer 50 and upper in a variety of manners. As shown in FIG. 3, the mesh substrate layer 40 can be adjacent, engaged with and/or bonded with the lateral and medial midsole sidewalls 30L and 30M. The mesh substrate layer 40 can extend upward over, and can fold or otherwise transition over the transition lips 33 and 34 above the respective sidewalls. The layer 40 can further extend downward in a curvilinear path toward and optionally over a portion of the midsole upper surface 30U. The layer can be disposed in the recess between the opposing transitions or lips 33 and 34, or just above the upper surface.

The mesh substrate layer 40 can include respective upper portions 40U and lower portions 40L on the lateral L and medial M sides of the longitudinal axis LA. In the upper portion 40U, the mesh substrate layer 40 can extend from the midsole medial sidewall 30M toward the longitudinal axis LA of the midsole, ending at an upper medial mesh edge 46. The mesh substrate layer 40 can extend in the upper portion 40U from the midsole lateral sidewall 30L toward the longitudinal axis LA of the midsole, ending at an upper lateral mesh edge 45. Optionally, the medial mesh edge and the lateral mesh edge can be joined directly with the midsole upper surface. The lateral and medial edges 45 and 46 can be located between the longitudinal axes and the lateral and medial sidewalls respectively, particularly in the arch region 14 and the forward part of the heel region 16 and rearward part of the forefoot region 12. These edges may, however, cross the longitudinal axis in the toe region and/or the heel region, when the mesh substrate layer 40 extends around the entire outer perimeter of the midsole 30. The lateral and medial edges also can be distal from one another across the longitudinal axis such that the mesh substrate layer does not extend completely across a width W of the footwear, perpendicular to the longitudinal axis LA, in an arch region or other regions of the footwear from the lateral midsole sidewall 30M to the medial midsole sidewall 30L. In this manner, the upper surface 30U of the midsole is not covered entirely by the mesh substrate layer. Instead, only the edges or perimeter of the upper midsole surface are covered. Of course, in some applications, the mesh substrate layer can extend across the entire width of the midsole, and cover the entire upper midsole surface 30U.

Where the footwear includes a Strobel board 18 at the lower part of the upper, the mesh substrate layer 40 can extend inward from the midsole lateral sidewall 30L between the Strobel board 18 and the midsole upper surface 30U, without crossing the longitudinal axis LA. Likewise, the mesh substrate layer 40 can extend inward from the midsole medial sidewall 30M between the Strobel board 18 and the midsole upper surface 30U, without crossing the longitudinal axis LA. Generally, the edges and portions of the layer 40 can be sandwiched between the midsole and the Strobel board and/or lower peripheral allowance 13.

In the lower portion 40L, the mesh substrate layer 40 can extend from the midsole medial sidewall 30M toward the longitudinal axis LA of the midsole, ending at a lower medial mesh edge 48. The mesh substrate layer 40 can extend in the lower portion 40L from the midsole lateral sidewall 30L toward the longitudinal axis LA of the midsole, ending at a lower lateral mesh edge 47. Optionally, the medial mesh edge and the lateral mesh edge can be joined directly with the midsole lower surface 40LS. The lateral and medial edges 47 and 48 can be located between the longitudinal axis and the lateral and medial sidewalls respectively, particularly in the arch region 14 and the forward part of the heel region 16 and rearward part of the forefoot region 12. These edges may, however, cross the longitudinal axis in the toe region and/or the heel region, when the mesh substrate layer 40 extends around the entire outer perimeter of the midsole 30.

The lateral and medial edges also can be distal from one another across the longitudinal axis such that the mesh substrate layer does not extend completely across a width W of the footwear, perpendicular to the longitudinal axis LA, in an arch region or other regions of the footwear from the lateral midsole sidewall 30M to the medial midsole sidewall 30L. In this manner, the lower surface 30LS of the midsole is not covered entirely by the mesh substrate layer. Instead, only the edges or perimeter of the upper midsole surface are covered. Of course, in some applications, the mesh substrate layer can extend across the width of the midsole, and cover the entire lower midsole surface 30L.

Where the footwear includes the outsole layer 50, the mesh substrate layer 40 can extend inward from the midsole lateral sidewall 30L between the outsole layer 50 and the midsole lower surface 30L, without crossing the longitudinal axis LA. Likewise, the mesh substrate layer 40 can extend inward from the midsole medial sidewall 30M between the outsole layer 50 and the midsole lower surface 30L, without crossing the longitudinal axis LA. Generally, the edges and portions of the layer 40 can be sandwiched between the midsole and the outsole layer. Optionally, the outsole layer 50 completely covers the lower portion adjacent the midsole lower surface 30LS such that no part of the mesh substrate layer 40 forms the lowermost or ground contacting part of the sole assembly. The mesh substrate layer also optionally does not form any type of traction enhancing element on the sole assembly because it does not engage the ground directly.

A method of making the footwear 10 and sole assembly 20 in particular will now be described with reference to FIGS. 4-10 and 1. In general, the method can include providing a midsole mold cavity in the shape of a foot, the mold cavity including a mold sidewall; securing a strip of a mesh substrate layer around a portion of the mold cavity so that the mesh substrate layer is adjacent the mold sidewall; closing the mold cavity with a mold plate; introducing a material into the mold cavity so that the material bonds to the mesh substrate layer; allowing the material to cure in the mold cavity to form a midsole; and removing the midsole from the mold cavity with the mesh substrate layer bonded to and covering a midsole sidewall.

Figure 4:
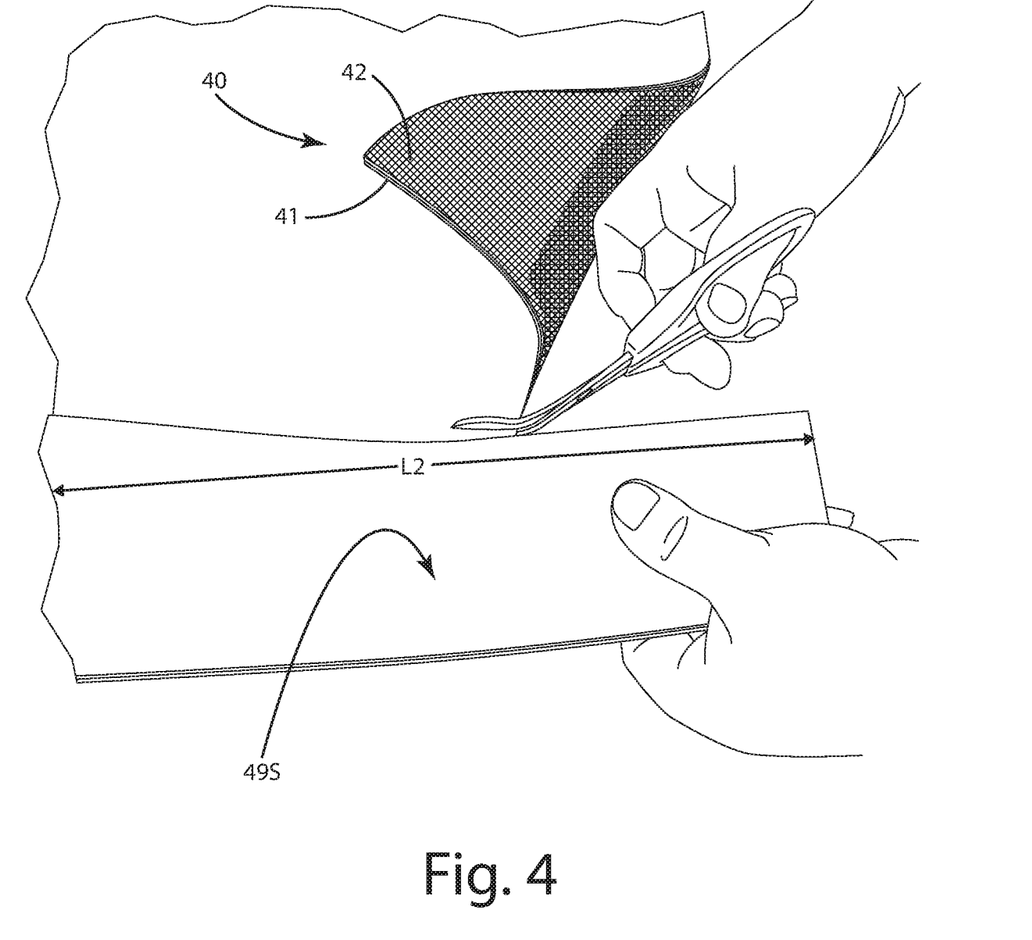
FIG. 4 is a view of a mesh substrate layer being cut into strips for use with a midsole mold.

As shown in FIG. 4, the mesh substrate layer 40 including the respective film sheet 41 and mesh layer 42 can be cut from a larger piece of such material into strips 49S that are of sufficient length L2 to extend around perimeters 73 of the respective mold cavities, generally to circumscribe or surround a perimeter of a midsole 40 to be produced and molded in the mold cavity.

Figure 5:
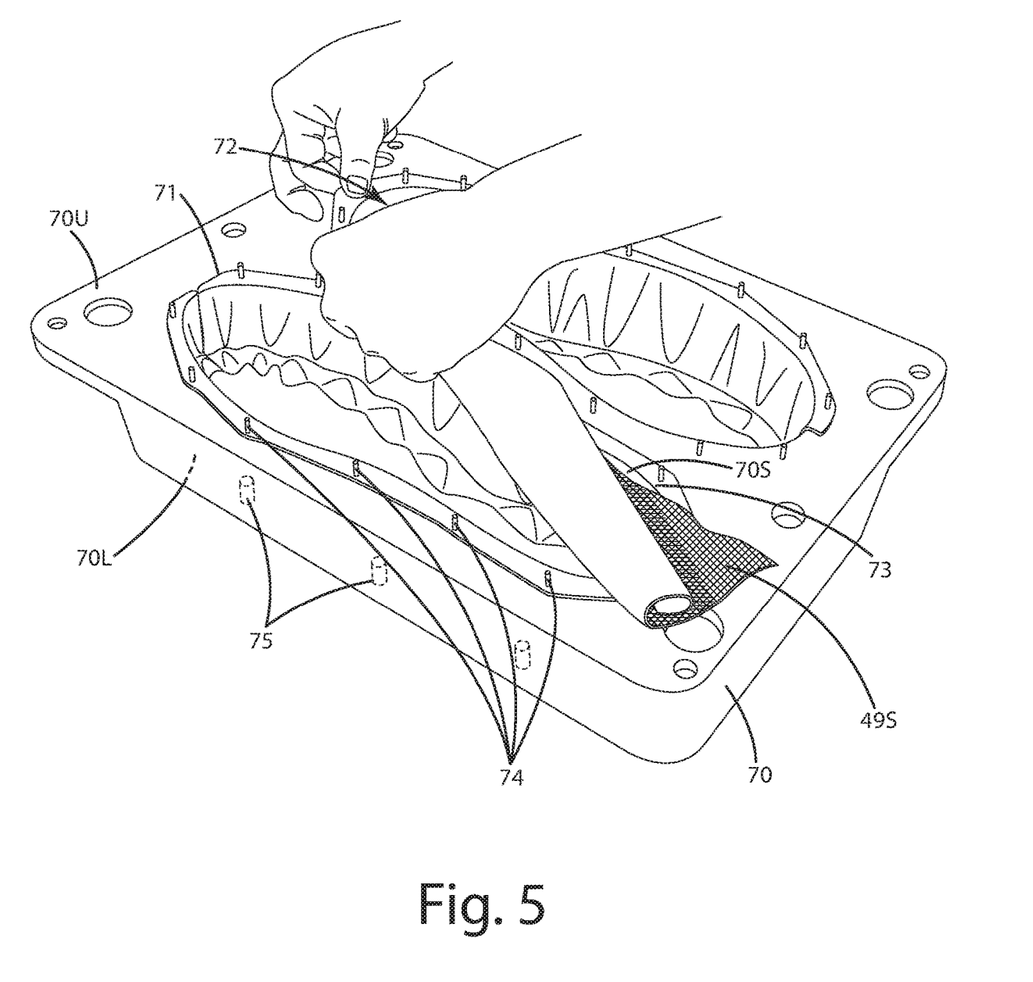
FIG. 5 is a perspective view of the mesh substrate layer strip being secured with pins around a perimeter of a mold cavity for the midsole.

With the strips 49S of the mesh substrate layer cut, they can be placed in exemplary left and right mold cavities 71 and 72, which as shown are left and right mold cavities. For simplicity, only the right mold cavity 71 and its features will be described here. That mold cavity can be defined by a mold or first plate 70. The mold cavity 71 can have the perimeter 73, which can correspond to the outside or outer shape of the midsole or other sole component to be formed therein. The mold 70 can include multiple pins 74 extending upward from the upper mold surface 70U, beyond the perimeter 73. These pins 74 can be relatively small diameter, optionally less than 3 mm, less than 2 mm, less than 1 mm so that they can penetrate the material 49S as described below. The pins can be placed around the perimeter so that they can cooperatively hold the edges of the strips of material away from the actual mold cavity 71 when midsole material is introduced into the cavity. Another set of pins 75 optionally can be included on the lower surface 70L of the mold. Each of the respective pin sets 74 and 75 can be configured to hold parts of the respective upper and lower portions of the mesh substrate layer 40 as described above during a molding process.

Optionally, the pins 74 and 75 can be replaced with a clamp that holds the edges of the strip away from the mold cavity so that the midsole material can be introduced into the mold cavity. Further optionally, the edges of the strip or layer 40 can be held by a ring and groove around the perimeter, or other mechanisms suitable for holding that edge. In some cases, the lower portion can be held in place between the mold 70 and another plate 78 as described below. Generally, the upper portion 40U of the mesh substrate layer can be secured above the mold sidewall 70S away from the mold cavity. The lower portion 40L of the mesh substrate layer 40 can be secured below the mold sidewall 70S away from the mold cavity.

Figure 6:
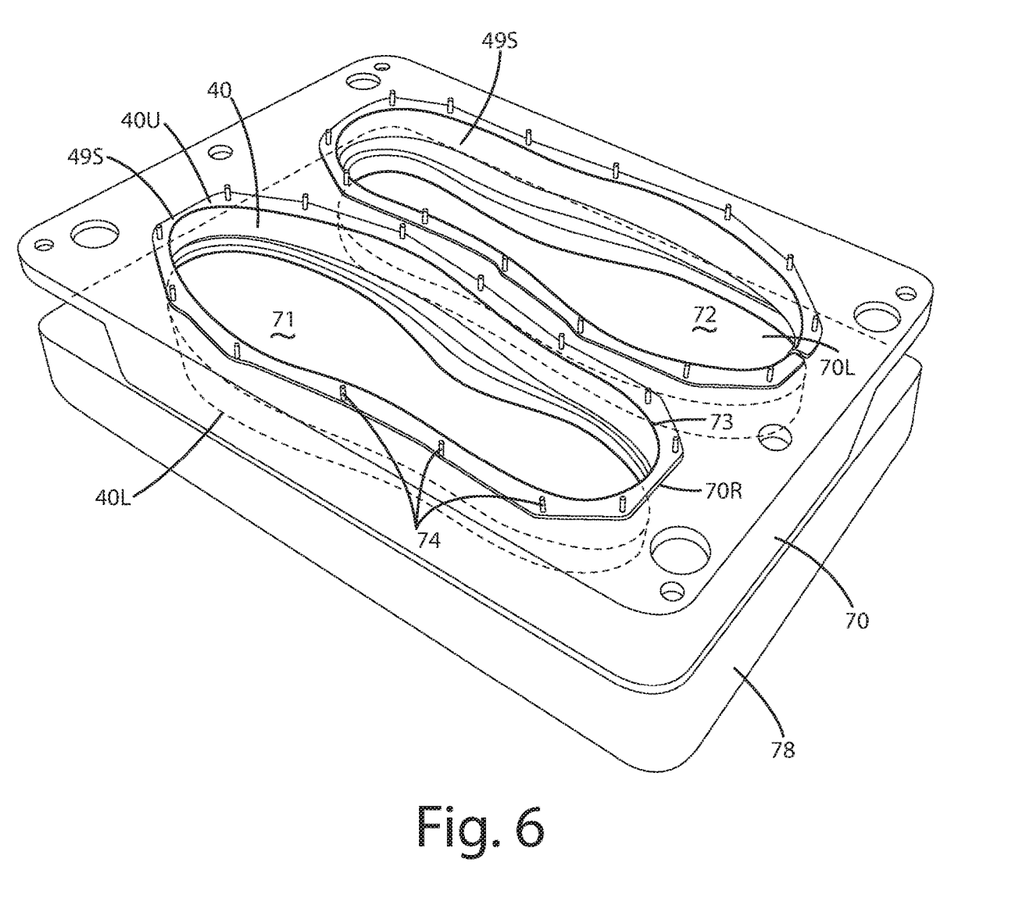
FIG. 6 is a perspective view of left/right midsole cavities prepared and lined with the mesh layer substrate before the midsole material is introduced into the cavities, and with a bottom plate closing a bottom portion of the mold cavities.

The strip 49S is placed around the perimeter of the respective cavities. The upper 40U and lower 40L portions are captured on the pins, with the pins optionally penetrating the layer as shown in FIG. 6. There, another plate 78 can be placed adjacent the mold 70 to further close the cavities. The lower portion and part of its edge can be trapped or sandwiched between the mold 70 and the lower plate 78. The mesh substrate layer 40 mentioned above can include the mesh material 42 having a mesh exterior surface 42E and a mesh interior surface 42I, as well as the film sheet 41 having a film interior surface 41I and a film exterior surface 41E. The mesh interior surface can be adjacent the film exterior surface when the strip is placed in the mold.

Figure 7:
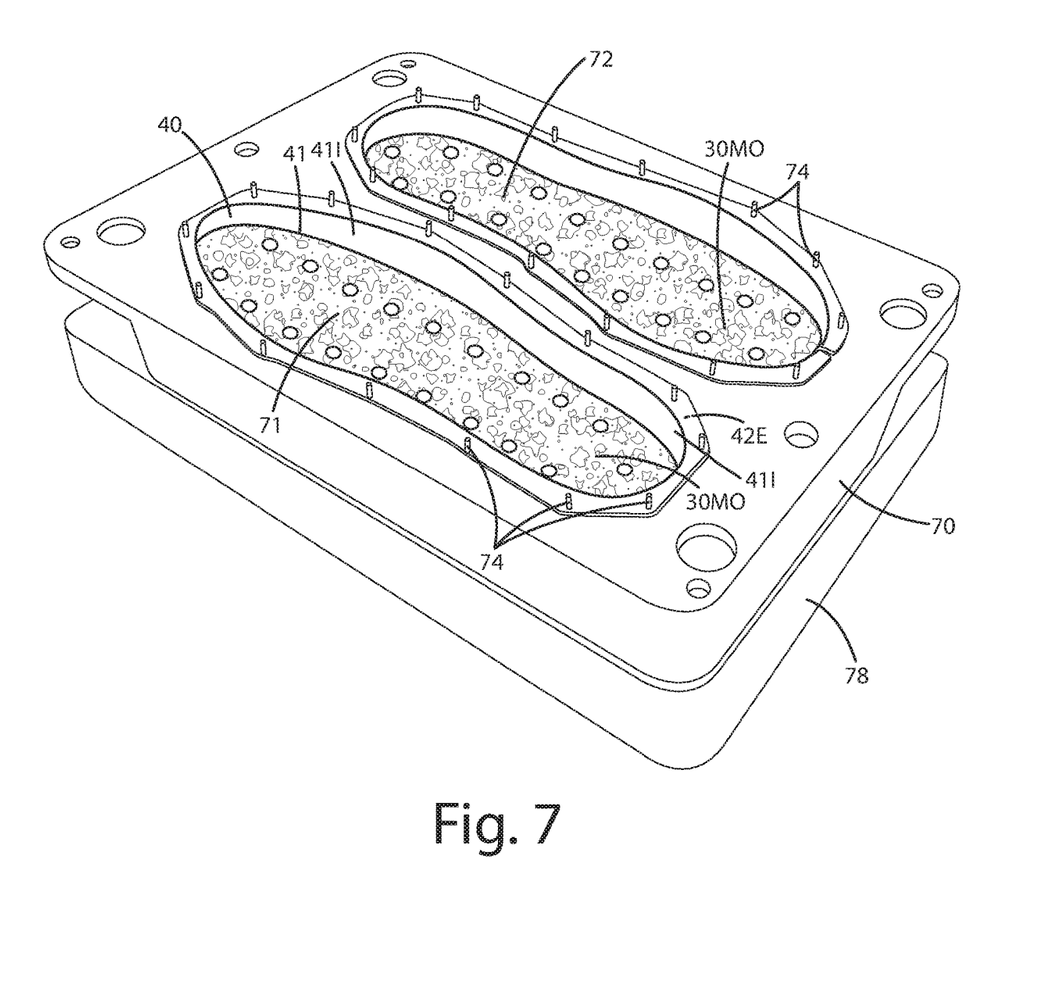
FIG. 7 is a perspective view of left/right midsole cavities with midsole material curing with the mesh layer substrate to form the midsoles with the mesh substrate layers attached to its sidewalls.

The film interior surface 41I can be placed so it faces inward into the mold cavity. The mesh exterior surface 42E can be placed so the mesh exterior surface faces outward toward and engages the mold sidewall 70S. The midsole material or other sole material, for example, PEDA, eTPU, EVA or other material 30MO can be introduced into the respective cavities 71 and 72 as shown in FIG. 7. This introduction of material can be via pour molding, injection molding or some other introduction of the material into the cavities. There, the material 30MO bonds with the mesh substrate layer 40. Where a film 41 is included, the material bonds with the interior film surface, optionally physically and chemically in some cases. The material 30MO however, optionally does not contact the parts of the strips held by the pins 74 and 75 away from the cavity. In those cases, the film sheet can remain generally untouched and not contacted by that material as it is introduced into the cavity. Optionally, the upper portion and lower portion do not contact the material as the material is introduced so that the upper portion and lower portion are free extending from the midsole after the curing.

Figure 8:
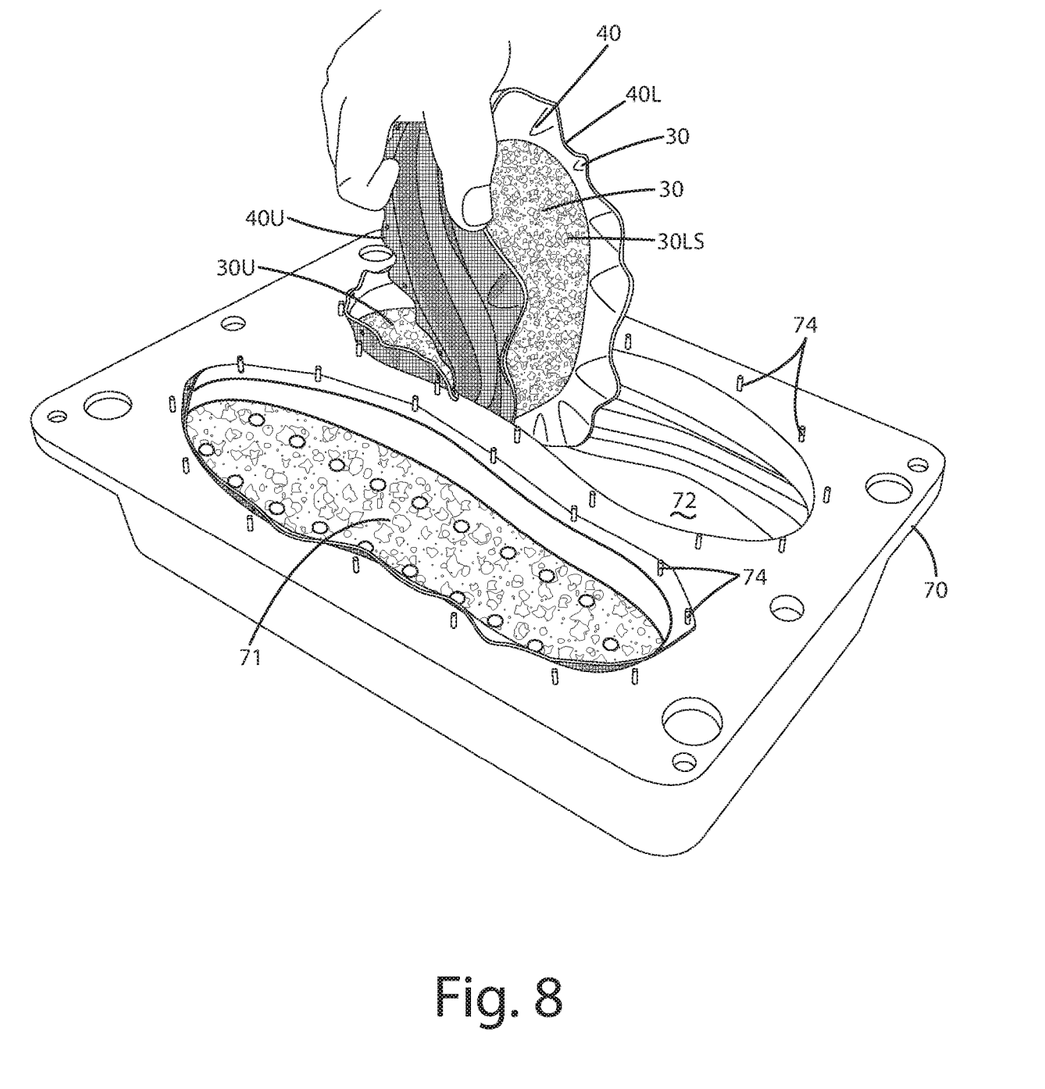
FIG. 8 is a perspective view of left/right midsole cavities with a cured midsole being removed, showing the mesh substrate layer being pulled off pins that secured the mesh to around the perimeter of the mold cavity.

After the midsole material 30MO is allowed to cure, it forms the midsole 30, which includes the mesh substrate layer 40 secured thereto. When cured, the midsole 30 and attached layer 40 can be pulled from the cavities 71 and 72 as shown in FIG. 8. There, the upper portion 40U and lower portion 40L are free from attachment to the midsole, and extend beyond the upper and lower surfaces thereof. This is better shown in FIGS. 9 and 10.

Figure 9:
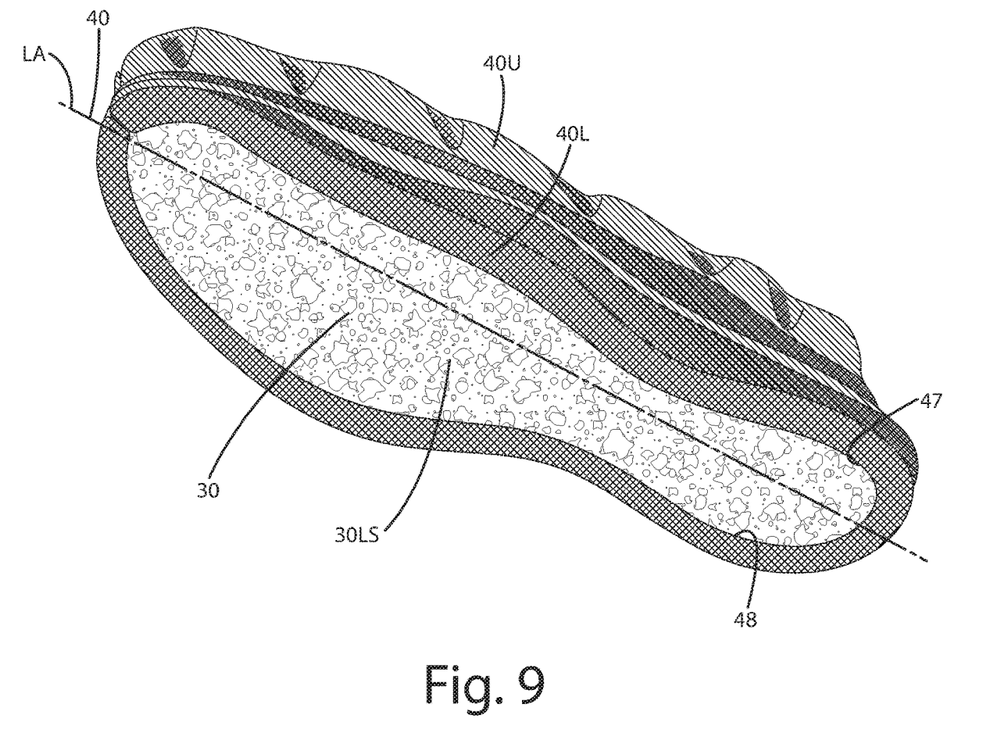
FIG. 9 is a perspective view of the midsole with the attached mesh substrate layer being trimmed to produce a lower portion that is secured to a midsole lower surface.
Figure 10:
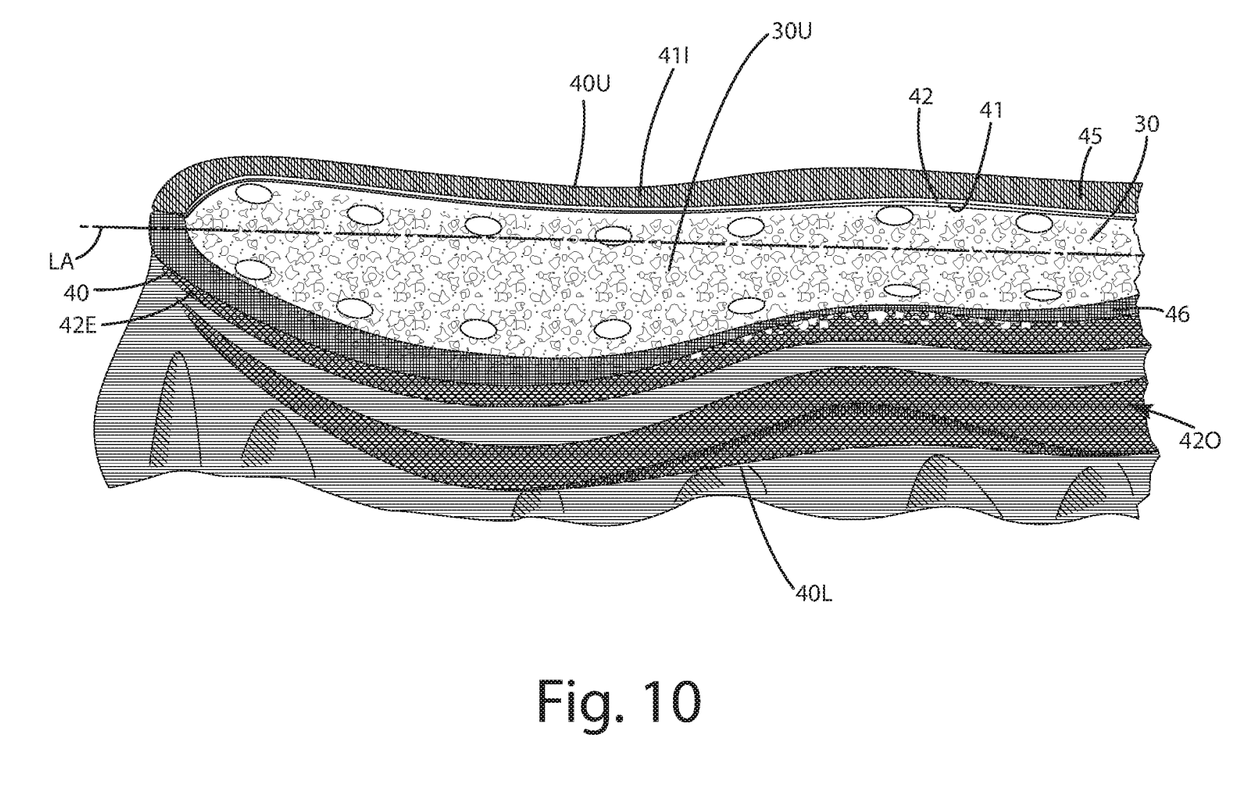
FIG. 10 is a perspective view of the midsole with the attached mesh substrate layer being trimmed to produce an upper portion that is secured to a midsole upper surface.

The mesh substrate layer 40 can thereafter be trimmed at least one of above and below the midsole. In particular, as shown in FIG. 9, the lower portion 40L can be trimmed around the perimeter of the midsole 30 to form edges 47 and 48. These edges and the layer 40 in general can be folded toward the longitudinal axis LA of the midsole, optionally over the transitions 33 and 34. Once folded, the edges and portions overlapping the lower surface 30LS can be adhered to the midsole lower surface 30LS to secure it thereto. The upper portion 40U also can be trimmed around the perimeter of the midsole 30 to form edges 45 and 46. These edges and the layer 40 in general can be folded toward the longitudinal axis LA of the midsole. Once folded, the edges and portions overlapping the upper surface can be adhered to the midsole upper surface 30U to secure it thereto.

Optionally, in some cases, the upper portions and lower portions can be perfectly cut and sized to only overlap the midsole sidewalls 30L, 30M and heel wall, such that the mesh substrate and its components need not be trimmed after the mesh substrate layer is joined with the midsole. Further optionally, in other applications, the midsole can be formed in a mold without the mesh substrate layer in that mold. In those applications, the mesh substrate layer 40 can later be adhered, cemented, laminated, sonic welded, hot welded, embedded, encapsulated, or otherwise joined with the midsole, for example, its sidewall and other surfaces.

After the midsole and mesh substrate layer are constructed, that midsole 30 can be joined with the outsole layer and the upper in the constructions mentioned above. The portions and edges of the mesh midsole layer thus can be hidden and sandwiched between the midsole and upper or midsole and outsole layer as mentioned above. The footwear can be completed and readied for further processing and shipment.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible The embodiments of the invention in which an exclusive property or privilege is claimed are defined as follows:

1. A footwear construction comprising:
   an upper including a lower peripheral allowance joined to a Strobel board to close a bottom of a void within the upper;
   a midsole constructed from a first material and including a midsole upper surface, a ground facing midsole lower surface, a midsole lateral sidewall and a midsole medial sidewall;
   an outsole layer joined with the midsole lower surface; and
   a mesh substrate layer covering the midsole lateral sidewall, the mesh substrate layer including an upper portion disposed adjacent the midsole upper surface and a lower portion disposed adjacent the midsole lower surface;
   wherein the outsole layer is disposed adjacent and covering the lower portion of the mesh substrate layer disposed adjacent the midsole lower surface,
   wherein the mesh substrate layer conceals and protects the midsole lateral sidewall from abrasion and damage by objects with which the footwear contacts during use by a wearer
   wherein the mesh substrate layer extends over at least one of the lower peripheral allowance and the Strobel board,
   wherein the midsole lateral sidewall and the midsole medial sidewall are formed by filling a midsole cavity with a material that flows to the mesh substrate layer and allowing the material to cure.

2. The footwear construction of claim 1,
   wherein the outsole layer completely covers the lower portion adjacent the midsole lower surface,
   wherein the lower portion is sandwiched between the outsole layer and the midsole lower surface.

3. The footwear construction of claim 1,
   wherein the mesh substrate layer includes a film sheet,
   wherein the mesh material is joined with the film sheet,
   wherein the film sheet contacts the midsole lateral sidewall,
   wherein the film sheet is between the mesh material and the midsole lateral wall.

4. The footwear construction of claim 1,
   wherein the upper portion of the mesh substrate layer includes an upper edge,
   wherein the lower portion of the mesh substrate layer includes a lower edge,
   wherein the midsole includes a longitudinal axis in an arch region of the footwear,
   wherein the upper edge is closer to the longitudinal axis than the lateral sidewall but does not cross the longitudinal axis in the arch region.

5. The footwear construction of claim 4,
   wherein the lower edge is closer to the longitudinal axis than the lateral sidewall but does not cross the longitudinal axis in the arch region.

6. The footwear construction of claim 5,
   wherein the upper edge and lower edge cross the longitudinal axis in at least one of a heel region and a toe region of the footwear.

7. The footwear construction of claim 1,
   wherein the mesh substrate layer includes a textile mesh material having a mesh exterior surface and a mesh interior surface, the textile mesh material defining a plurality of openings;
   wherein the mesh substrate layer includes a film sheet having a film interior surface and a film exterior surface,
   wherein the mesh interior surface is joined with the film exterior surface,
   wherein the film interior surface is joined with the lateral midsole sidewall,
   wherein the film exterior surface is visible through the plurality of openings.

8. The footwear construction of claim 7,
   wherein the mesh substrate layer is folded over a transition between the midsole lateral sidewall and the midsole upper surface such that the film interior surface directly engages the midsole lateral sidewall and the midsole upper surface.

9. The footwear construction of claim 1 comprising:
   an upper including a lower Strobel board,
   wherein the mesh substrate layer extends inward from the midsole lateral sidewall between the Strobel board and the midsole upper surface, without crossing a longitudinal axis in an arch region of the footwear.

10. A footwear construction comprising:
    an upper including a lower peripheral allowance stitched to a Strobel board to close a bottom of a void within the upper;
    a midsole including a midsole upper surface, a ground facing midsole lower surface, a midsole lateral sidewall and a midsole medial sidewall;
    an outsole layer joined with the midsole lower surface;
    a mesh substrate layer covering the midsole lateral sidewall, the mesh substrate layer including an upper portion disposed adjacent the upper surface, and a lower portion disposed adjacent the midsole lower surface, the mesh substrate layer including a mesh material having a mesh exterior surface and a mesh interior surface, the mesh substrate layer including a film sheet having a film interior surface and a film exterior surface, the mesh interior surface being adjacent the film exterior surface; and
    an outsole layer covering the lower portion of the mesh substrate layer,
    wherein the mesh substrate layer covers the midsole lateral sidewall, thereby preventing abrasion and damage thereto by objects with which the footwear contacts during use by a wearer,
    wherein the mesh substrate layer extends over at least one of the lower peripheral allowance and the Strobel board.

11. The footwear construction of claim 10,
    wherein the mesh interior surface is bonded to the film exterior surface,
    wherein the film sheet is less than 5 mm in thickness,
    wherein the film sheet is visible through openings defined in the mesh material.

12. The footwear construction of claim 11,
    wherein the mesh substrate layer extends inward from the midsole lateral sidewall toward a longitudinal axis,
    wherein the mesh substrate layer terminates at an edge,
    wherein the edge is disposed between the midsole lateral sidewall and the longitudinal axis such that the mesh substrate layer does not extend across a width of the midsole that is perpendicular to the longitudinal axis.

13. The footwear construction of claim 10,
wherein the midsole lateral sidewall and the midsole medial sidewall are formed by filling a midsole cavity with a material that flows to the mesh substrate layer and allowing the material to cure.

14. The footwear construction of claim 10,
wherein the mesh substrate layer extends from the midsole medial sidewall toward a longitudinal axis of the midsole, ending at a medial mesh edge,
wherein the mesh substrate layer extends from the midsole lateral sidewall toward a longitudinal axis of the midsole, ending at a lateral mesh edge that is distal from the medial mesh edge such that the mesh substrate layer does not extend completely across an arch region of the footwear from the lateral midsole sidewall to the medial midsole sidewall.

15. The footwear construction of claim 14,
wherein the medial mesh edge and the lateral mesh edge are joined directly with the midsole upper surface,
wherein the mesh substrate layer extends upward over a curved transition lip between the lateral midsole sidewall and the midsole upper surface and downward toward the midsole upper surface.

16. A footwear construction comprising:
an upper including a lower peripheral allowance joined with a Strobel board to close a bottom of a void within the upper;
a midsole including a midsole upper surface, a ground facing midsole lower surface, a midsole lateral sidewall and a midsole medial sidewall;
an outsole layer joined with the midsole lower surface; and
a mesh substrate layer covering the midsole lateral sidewall, the mesh substrate layer including an upper portion disposed adjacent the midsole upper surface and a lower portion disposed adjacent the midsole lower surface;
wherein the outsole layer is disposed adjacent and covering the lower portion of the mesh substrate layer disposed adjacent the midsole lower surface,
wherein the mesh substrate layer conceals and protects the midsole lateral sidewall and the midsole medial sidewall from abrasion and damage by objects with which the footwear contacts during use by a wearer.

\* \* \* \* \*